United States Patent
Lv (10) Patent No.: US 9,210,025 B2
(45) Date of Patent: Dec. 8, 2015

(54) METHOD AND APPARATUS FOR CORRECTING IN-PHASE SIGNAL AND QUADRATURE-PHASE SIGNAL

(71) Applicant: Huawei Technologies Co., Ltd., Shenzhen (CN)

(72) Inventor: Rui Lv, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/279,070

(22) Filed: May 15, 2014

(65) Prior Publication Data

US 2014/0247912 A1 Sep. 4, 2014

Related U.S. Application Data

(63) Continuation of application No. PCT/CN2011/082240, filed on Nov. 15, 2011.

(51) Int. Cl.
| | |
|---|---|
| H04J 3/06 | (2006.01) |
| G01C 21/02 | (2006.01) |
| H04L 27/38 | (2006.01) |
| H04L 1/24 | (2006.01) |
| H04L 27/36 | (2006.01) |
| H04L 25/06 | (2006.01) |

(52) U.S. Cl.
CPC ............ *H04L 27/3854* (2013.01); *H04L 1/243* (2013.01); *H04L 25/06* (2013.01); *H04L 27/364* (2013.01); *H04L 27/3863* (2013.01)

(58) Field of Classification Search
None
See application file for complete search history.

(56) References Cited

U.S. PATENT DOCUMENTS

| | | | | | |
|---|---|---|---|---|---|
| 5,058,135 | A | * | 10/1991 | Daulasim | H04L 27/362 375/261 |
| 5,233,479 | A | | 8/1993 | Nakatsu et al. | |
| 5,269,065 | A | * | 12/1993 | Ida | G01C 17/28 33/269 |
| 5,305,352 | A | * | 4/1994 | Calderbank | H03M 13/35 375/261 |

(Continued)

FOREIGN PATENT DOCUMENTS

| | | |
|---|---|---|
| CN | 1341297 A | 3/2002 |
| CN | 1578295 A | 2/2005 |

(Continued)

OTHER PUBLICATIONS

CN 201180002493.7 Office Action 1, mailed Jul. 31, 2013, 6 pages.

(Continued)

*Primary Examiner* — Chieh M Fan
*Assistant Examiner* — Sarah Hassan
(74) *Attorney, Agent, or Firm* — Slater & Matsil, L.L.P.

(57) ABSTRACT

The present invention discloses a method for correcting an IQ signal. includes: saving an I signal of a last frame and a Q signal of the last frame that are output by a receiving front end; eliminating a direct-current offset of an I signal of a current frame and a direct-current offset of a Q signal of the current frame according to the I signal of the last frame and the Q signal of the last frame; and geometrically correcting an I signal of the current frame after direct-current offset elimination and a Q signal of the current frame after direct-current offset elimination according to an I signal of the last frame after direct-current offset elimination and a Q signal of the last frame after direct-current offset elimination to obtain a corrected I signal of the current frame and a corrected Q signal of the current frame.

17 Claims, 9 Drawing Sheets

(56) References Cited

U.S. PATENT DOCUMENTS

| | | | |
|---|---|---|---|
| 5,442,655 A * | 8/1995 | Dedic et al. | 375/340 |
| 5,822,371 A * | 10/1998 | Goldstein | H04B 14/023 375/242 |
| 6,097,776 A * | 8/2000 | Mesiwala | H04L 27/2662 370/513 |
| 6,388,441 B1 * | 5/2002 | Chen | 324/303 |
| 6,654,596 B1 | 11/2003 | Jakobsson et al. | |
| 7,649,934 B2 * | 1/2010 | Su | 375/235 |
| 2002/0054630 A1 * | 5/2002 | Hoefer | H04L 25/4927 375/222 |
| 2003/0194014 A1 * | 10/2003 | Modlin | H04L 25/4927 375/242 |
| 2003/0206603 A1 | 11/2003 | Husted | |
| 2004/0049725 A1 * | 3/2004 | Golitschek | H04L 1/0003 714/749 |
| 2004/0082302 A1 | 4/2004 | Shippee | |
| 2005/0025041 A1 | 2/2005 | Marsili | |
| 2005/0062513 A1 * | 3/2005 | Sim | 327/307 |
| 2006/0068739 A1 * | 3/2006 | Maeda et al. | 455/295 |
| 2009/0323861 A1 | 12/2009 | Safavi | |

FOREIGN PATENT DOCUMENTS

| | | |
|---|---|---|
| CN | 102045278 A | 5/2011 |
| CN | 102549994 B | 3/2014 |
| WO | 2012167555 A1 | 12/2012 |

OTHER PUBLICATIONS

CN 201180002493.7, Notice of Allowance, mailed Dec. 25, 2013, 2 pages.

Mailand et al., "Blind IQ-Imbalance Compensation Using Iterative Inversion for Arbitrary Direct Conversion Receivers," 14th 1st Mobile & Wireless Communications Summit, vol. 14, Jun. 19-23, 2005, 5 pages.

International Search Report received in PCT/CN2011/082240, mailed Aug. 23, 2012, 9 pages.

* cited by examiner

METHOD AND APPARATUS FOR CORRECTING IN-PHASE SIGNAL AND QUADRATURE-PHASE SIGNAL

This application is a continuation of International Application No. PCT/CN2011/082240, filed on Nov. 15, 2011, which is hereby incorporated by reference in its entirety.

TECHNICAL FIELD

The present invention relates to the field of signal processing and, in particular embodiments, to a method and an apparatus for correcting an in-phase signal and a quadrature-phase signal.

BACKGROUND

Figure 1:
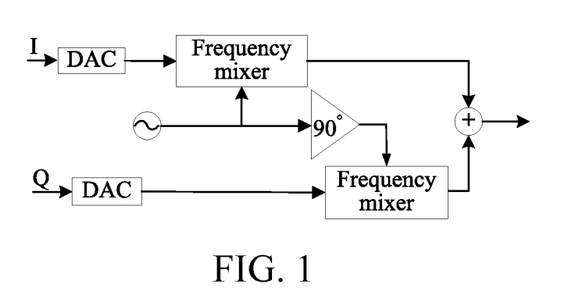
FIG. 1 is a schematic diagram of IQ signal modulation according to the background of the present invention.
Figure 2:
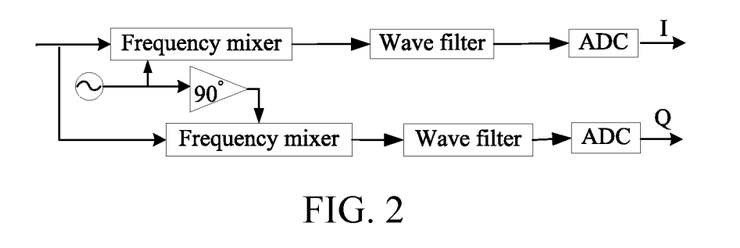
FIG. 2 is a schematic diagram of IQ signal demodulation and separation according to the background of the present invention.

In a signal processing technology, complex signals are generally divided by quadrature sampling into two channels of signals (that is, IQ signals, which may also be written as I/Q signals): I (In-Phase) signals and Q (Quadrature-Phase) signals. In a communication system, IQ signals are modulated into a quadrature carrier by using a frequency mixer at a transmit end and then transmitted, as shown in FIG. 1. At a receive end, IQ signals are demodulated and separated by using the quadrature carrier, as shown in FIG. 2. For correct decomposition and synthesis of complex signals, it is required that the two channels of signals, that is, the IQ signals, have a same amplitude gain and an absolute quadrature phase difference.

During the implementation of the present invention, the inventor has discovered at least the following problems in the prior art.

In an actual system, because a frequency mixer, a DAC (Digital-Analog Converter), an ADC (Analog-Digital Converter), and a wave filter are not ideal and transmission channel characteristics are inconsistent, IQ signals do not have a completely same amplitude gain. Because a phase shifter is not ideal and a channel phase is distorted non-linearly, phases of IQ signals are not completely quadrature; and IQ signals will have a direct-current offset due to factors such as local oscillator leakage in the system. Therefore, in an actual communication system, an I signal $s'_I$ and a Q signal $s'_Q$ obtained at a receive end are often distorted coupling of a transmit I signal $s_I$ and a transmit Q signal $s_Q$. Formulas (1) and (2) show specific relations.

$$s'_I = DC_I + a_I \times (s_I \cos(\psi_I) + s_Q \sin(\psi_I)) \quad (1)$$

$$s'_Q = DC_Q + a_Q \times (s_Q \cos(\psi_Q) + s_I \sin(\psi_Q)) \quad (2)$$

where $DC_I$ and $DC_Q$ respectively indicate a direct-current offset of an I signal and a direct-current offset of a Q signal; $a_I$ and $a_Q$ respectively indicate a gain amplitude of the I signal and a gain amplitude of the Q signal; and $\psi_I$ and $\psi_Q$ respectively indicate a phase offset of the I signal and a phase offset of the Q signal.

Distortion of IQ signals will directly cause distortion of a receive signal constellation diagram, greatly affecting performance of subsequent equalization and demodulation. Although currently a method of improving circuit component quality and circuit design can reduce a signal distortion degree, this manner will bring an extremely high hardware cost.

SUMMARY OF THE INVENTION

To solve the existing problem of IQ signal distortion, embodiments of the present invention provide a method and an apparatus for correcting IQ signals. The technical solutions are as follows.

A method is provided for correcting IQ signals. A I signal of a last frame and a Q signal of the last frame are saved. An I signal of a current frame and a Q signal of the current frame are received. A direct-current offset of the I signal of the current frame is eliminated according to the I signal of the last frame and a direct-current offset of the Q signal of the current frame is eliminated according to the Q signal of the last frame. An I signal of the last frame after direct-current offset elimination and a Q signal of the last frame after direct-current offset elimination are saved. An I signal of the current frame after direct-current offset elimination and a Q signal of the current frame after direct-current offset elimination are geometrically corrected according to the I signal of the last frame after direct-current offset elimination and the Q signal of the last frame after direct-current offset elimination to obtain a corrected I signal of the current frame and a corrected Q signal of the current frame.

An apparatus for correcting IQ signals includes a number of modules. A first saving module is configured to save an I signal of a last frame and a Q signal of the last frame. A first correcting module is configured to receive an I signal of a current frame and a Q signal of the current frame, to eliminate a direct-current offset of the I signal of the current frame according to the I signal of the last frame saved by the first saving module, and to eliminate a direct-current offset of the Q signal of the current frame according to the Q signal of the last frame saved by the first saving module. A second saving module is configured to save an I signal of the last frame after direct-current offset elimination and a Q signal of the last frame after direct-current offset elimination that are obtained by the first correcting module. A second correcting module is configured to geometrically correct an I signal of the current frame after direct-current offset elimination and a Q signal of the current frame after direct-current offset elimination according to the I signal of the last frame after direct-current offset elimination and the Q signal of the last frame after direct-current offset elimination that are saved by the second saving module to obtain a corrected I signal of the current frame and a corrected Q signal of the current frame.

Technical solutions provided in the embodiments of the present invention bring the following beneficial effects. An I signal of a last frame and a Q signal of the last frame are buffered, and direct-current offset elimination and geometric correction are performed for an I signal of a current frame and a Q signal of the current frame according to the I signal of the last frame and the Q signal of the last frame. In this way, distortion of IQ signals and distortion of an IQ signal constellation diagram can be eliminated to facilitate subsequent signal processing and demodulation without using hardware, thereby greatly lowering a hardware cost.

BRIEF DESCRIPTION OF THE DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention more comprehensible, the following further describes embodiments of the present invention in detail with reference to the accompanying drawings.

Figure 3:
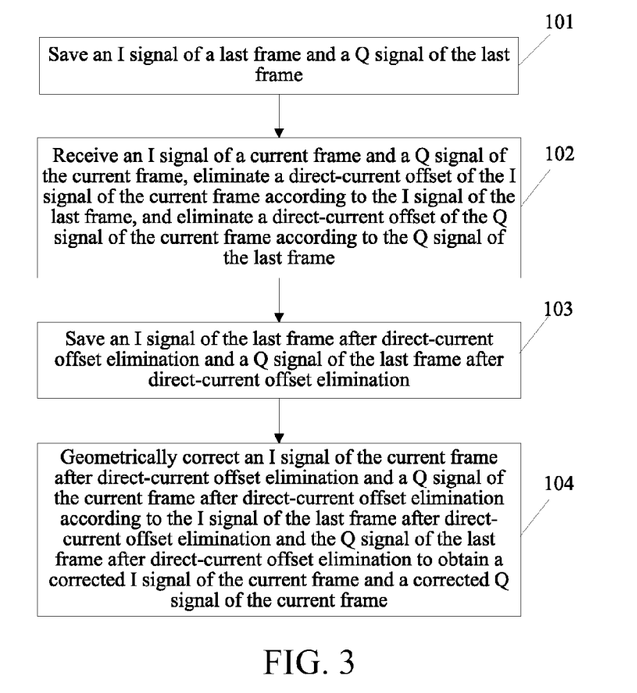
FIG. 3 is a schematic flowchart of a method for correcting IQ signals according to Embodiment 1 of the present invention.

As shown in FIG. 3, the first embodiment (Embodiment 1) provides a method for correcting IQ signals. The method specifically includes the following steps.

101. Save an I signal of a last frame and a Q signal of the last frame.

102. Receive an I signal of a current frame and a Q signal of the current frame, eliminate a direct-current offset of the I signal of the current frame according to the I signal of the last frame, and eliminate a direct-current offset of the Q signal of the current frame according to the Q signal of the last frame.

103. Save an I signal of the last frame after direct-current offset elimination and a Q signal of the last frame after direct-current offset elimination.

104. Geometrically correct an I signal of the current frame after direct-current offset elimination and a Q signal of the current frame after direct-current offset elimination according to the I signal of the last frame after direct-current offset elimination and the Q signal of the last frame after direct-current offset elimination to obtain a corrected I signal of the current frame and a corrected Q signal of the current frame.

In the method for correcting IQ signals according to the embodiment of the present invention, an I signal of a last frame and a Q signal of the last frame are buffered, and direct-current offset elimination and geometric correction are performed on an I signal of a current frame and a Q signal of the current frame according to the I signal of the last frame and the Q signal of the last frame. In this way, distortion of IQ signals and distortion of an IQ signal constellation diagram can be eliminated to facilitate subsequent signal processing and demodulation without using hardware, thereby greatly lowering a hardware cost.

Figure 4:
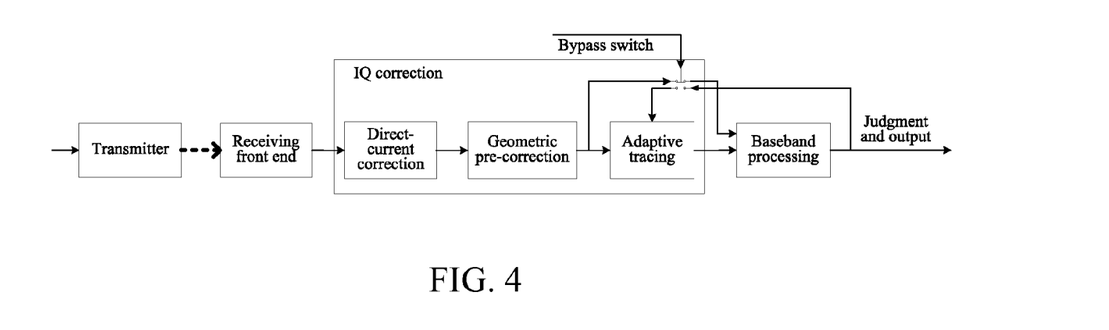
FIG. 4. is a schematic diagram of correcting IQ signals output by a receiving front end according to Embodiment 2 of the present invention.

A second embodiment (Embodiment 2) provides a method for correcting an in-phase signal and a quadrature-phase signal. As shown in FIG. 4, IQ signals output by a receiving front end may be corrected by using this method to eliminate distortion.

Figure 5:
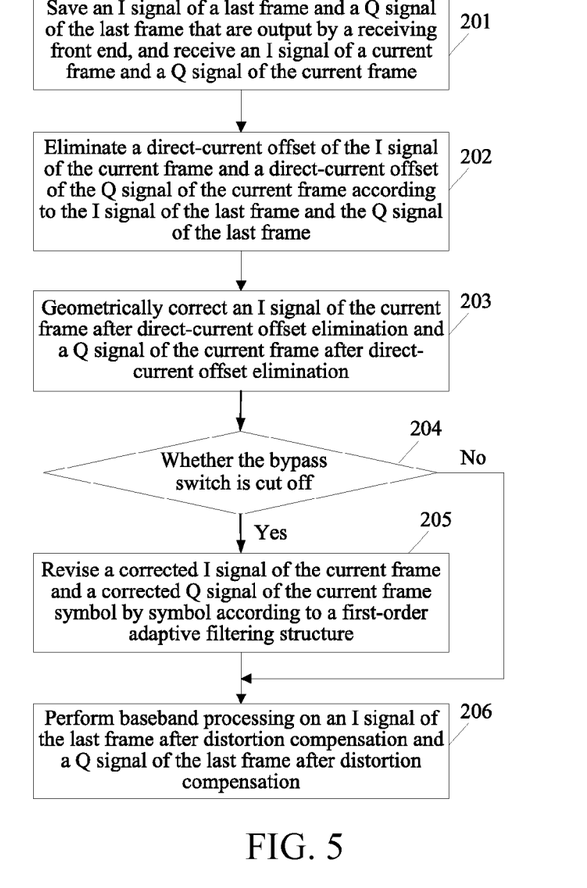
FIG. 5 is a schematic flowchart of a method for correcting an in-phase signal and a quadrature-phase signal according to Embodiment 2 of the present invention.

As shown in FIG. 5, a method for correcting an in-phase signal and a quadrature-phase signal is described in detail and specifically includes the following steps.

201. Save an I signal of a last frame and a Q signal of the last frame that are output by a receiving front end, and receive an I signal of a current frame and a Q signal of the current frame.

The last frame is a segment of continuous signal data prior to a current moment. Its length may be set according to a requirement.

202. Eliminate a direct-current offset of the I signal of the current frame and a direct-current offset of the Q signal of the current frame according to the I signal of the last frame and the Q signal of the last frame.

Figure 6:
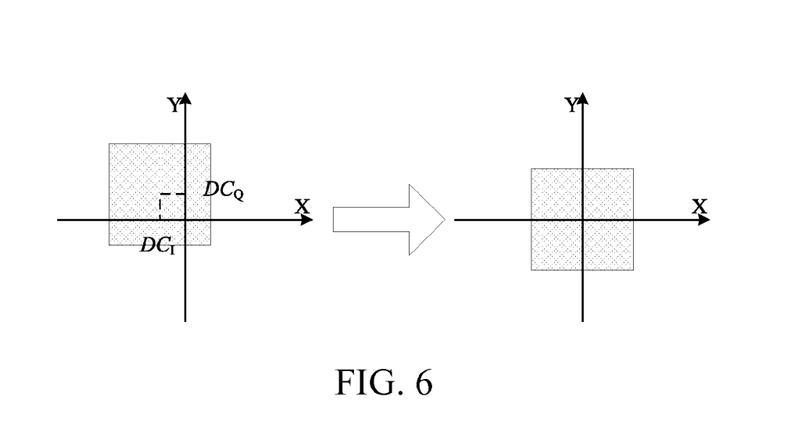
FIG. 6 is a schematic diagram of comparing a constellation diagram of normal IQ signals with a constellation diagram of distorted IQ signals according to Embodiment 2 of the present invention.

It should be noted that a constellation diagram of normal IQ signals uses a base point as a center, but a direct-current offset will cause the constellation diagram of the IQ signals to have an overall deviation. Therefore, as shown in FIG. 6, this step eliminates direct-current distortion.

Figure 7:
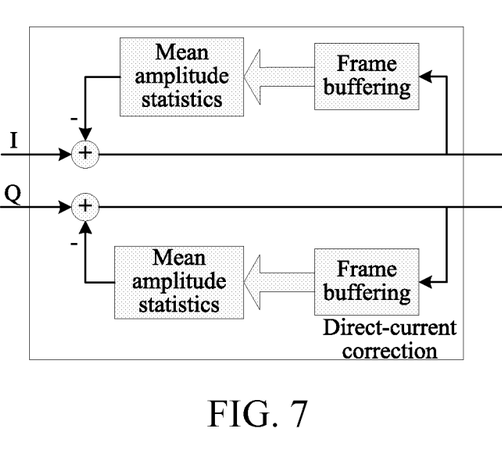
FIG. 7 is a schematic diagram of eliminating direct-current offsets of IQ signals according to Embodiment 2 of the present invention.

As shown in FIG. 7, eliminating a direct-current offset of the I signal of the current frame and a direct-current offset of the Q signal of the current frame according to the I signal of the last frame and the Q signal of the last frame specifically includes buffering the I signal of the last frame output by the receiving front end, statistically measuring an average level value of the I signal of the last frame to obtain a direct-current offset, and eliminating a direct-current offset of the I signal of the current frame according to the direct-current offset of the I signal of the last frame. The eliminating also includes buffering the Q signal of the last frame output by the receiving front end, statistically measuring an average level value of the Q signal of the last frame to obtain a direct-current offset, and eliminating a direct-current offset of the Q signal of the current frame according to the direct-current offset of the Q signal of the last frame.

As shown in FIG. 7, in step 202, a direct-current offset $DC_I$ of the I signal of the current frame is eliminated according to the direct-current offset of the I signal of the last frame, and a direct-current offset $DC_Q$ of the Q signal of the current frame is eliminated according to the direct-current offset of the Q signal of the last frame.

In this embodiment, time length of a frame is specifically 200 to 500 symbols. In addition, it is stipulated in this embodiment that one second equals 500 symbols.

It should be noted that, after the eliminating a direct-current offset of the I signal of the current frame and a direct-current offset of the Q signal of the current frame according to the direct-current offset of the I signal of the last frame and the direct-current offset of the Q signal of the last frame. This method further includes saving an I signal of the last frame after direct-current offset elimination and a Q signal of the last frame after direct-current offset elimination.

203. Geometrically correct an I signal of the current frame after direct-current offset elimination and a Q signal of the current frame after direct-current offset elimination according to the I signal of the last frame and the Q signal of the last frame.

In this embodiment, M-QAM (Multi-Level Quadrature Amplitude Modulation) signals are used as an example to describe a method for geometric correction. Due to asymmetry of a distortion matrix, an unbalanced constellation diagram of distorted IQ signals is symmetrical against a base point of coordinates. Accordingly, the geometrically correcting an I signal of the current frame after direct-current offset elimination and a Q signal of the current frame after direct-current offset elimination according to the I signal of the last frame and the Q signal of the last frame specifically includes the following steps.

203-1. Buffer the I signal of the last frame after direct-current offset elimination and the Q signal of the last frame after direct-current offset elimination, and express them by using a constellation diagram.

Figure 8:
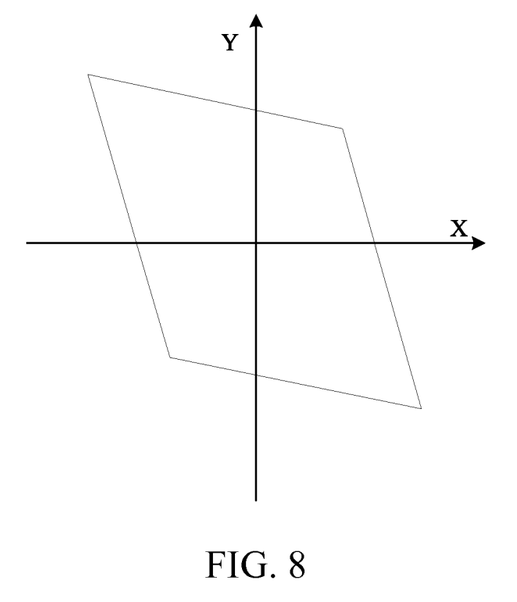
FIG. 8 is a constellation diagram of an I signal of a last frame and a Q signal of the last frame according to Embodiment 2 of the present invention.

FIG. 8 shows a constellation diagram of the I signal of the last frame after direct-current offset elimination and the Q signal of the last frame after direct-current offset elimination. In this embodiment, an uncorrected I signal of the last frame after direct-current offset elimination and an uncorrected Q signal of the last frame after direct-current offset elimination are used for description, and the constellation diagram is symmetrical against a base point.

203-2. Rotate a third quadrant and a fourth quadrant of the constellation diagram of the I signal of the last frame and the Q signal of the last frame around the base point by 180 degrees to coincide with a first quadrant and a second quadrant, and statistically measure mean vectors of all symbols of the last frame in the first quadrant and the second quadrant to obtain a first vector OA and a second vector OB.

Figure 9:
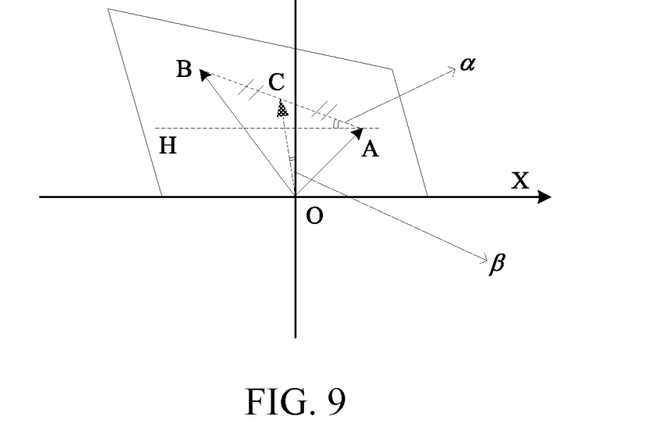
FIG. 9 is a constellation diagram of an I signal of a last frame and a Q signal of the last frame after conversion according to Embodiment 2 of the present invention.

203-3. Calculate a third vector OC and a fourth vector BA according to the first vector OA and the second vector OB, and calculate an included angle α between the fourth vector BA and an X axis.

In this embodiment, the third vector OC, the fourth vector BA, and the included angle α are specifically shown in FIG. 9.

The third vector OC is a mean vector of the first vector OA and the second vector OB. It is obtained after the sum of the first vector OA and the second vector OB is divided by 2.

The fourth vector BA is a difference between the first vector OA and the second vector OB.

It should be noted that the included angle α reflects overall rotation of the constellation diagram, an included angle β between the third vector OC and a Y axis reflects a rotary offset of a Q signal component relative to the Y axis, and |BA| and |OC| reflect relative amplitude distortion between the I signal and the Q signal.

Figure 10:
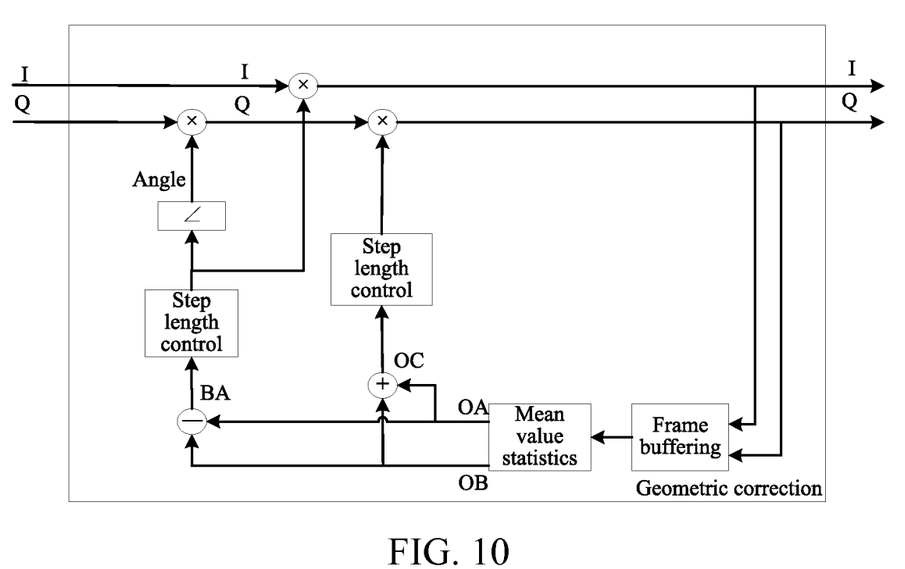
FIG. 10 is a schematic diagram of geometrically correcting an I signal of a current frame and a Q signal of the current frame according to Embodiment 2 of the present invention.

203-4. Geometrically correct an I signal of the current frame after direct-current offset elimination and a Q signal of the current frame after direct-current offset elimination according to the third vector OC, the fourth vector BA, and the included angle α.

In this embodiment, the geometric correction is specifically determining an IQ unbalanced shape of the I signal of the last frame and the Q signal of the last frame by using two statistical vectors of the I signal of the last frame and the Q signal of the last frame in a signal space, and adjusting gain and rotation of the IQ signals of the current frame in stepping mode by using parameters of the statistical vectors to ultimately obtain balanced IQ signals.

Specifically, as shown in FIG. 10, geometrically correcting an I signal of the current frame after direct-current offset elimination and a Q signal of the current frame after direct-current offset elimination according to the third vector OC, the fourth vector BA, and the included angle α includes multiplying the I signal of the current frame after direct-current offset elimination by the fourth vector BA to obtain a corrected I signal, and multiplying the Q signal of the current frame after direct-current offset elimination by the included angle α and then by the third vector OC to obtain a corrected Q signal.

The included angle α is the angle between the fourth vector BA and the X axis, and may be obtained by getting an angle of the fourth vector BA.

It should be noted that, before step 203-4, the method may further include controlling step length of the third vector OC and the fourth sector BA so as to avoid oscillation distortion due to over-compensation arising from excessive correction.

204. Determine whether a bypass switch is cut off, and if yes, execute step 205, or if not, execute step 206.

It should be noted that, after the geometric correction in step 203 is performed, distortion of the IQ signals has been compensated to a great extent. In a low-modulation-order communication system, remaining distortion after correction is no longer a major factor that affects subsequent judgment of bit errors, as compared with system noise. To reduce complexity of a correction algorithm and simplify a system structure, geometrically corrected IQ signals may be directly sent by using a bypass switch to a subsequent baseband processing module while a judgment feedback loop is cut off.

In a high-modulation-order system, in order to improve precision of distortion compensation of IQ signals and improve ability to track abrupt distortion in real time because length of frames statistically measured in geometric correction is larger and longer delay will be caused in high-order modulation, the bypass switch may be cut off to activate a subsequent adaptive tracking module and close the judgment feedback loop.

205. Revise the corrected I signal of the current frame and the corrected Q signal of the current frame symbol by symbol according to a first-order adaptive filtering structure.

Further, the revising the corrected I signal of the current frame and the corrected Q signal of the current frame symbol by symbol according to a first-order adaptive filtering structure specifically includes respectively performing distortion compensation on the corrected I signal of the current frame and the corrected Q signal of the current frame by using weight coefficients $C_I(k)$ and $C_Q(k)$ according to a formula (3) as follows:

$$\begin{cases} s_I(k) = C_I(k) \cdot s'_I(k) \\ s_Q(k) = C_Q(k) \cdot s'_Q(k) \end{cases} \quad (3)$$

where, $s'_I(k)$ is an I signal before the distortion compensation, that is, the corrected I signal of the current frame; $s'_Q(k)$ is a Q signal before the distortion compensation, that is, the corrected Q signal of the current frame; $s'_I(k)$ is an I signal after the distortion compensation; $s'_Q(k)$ is a Q signal after the distortion compensation; and k indicates a $k^{th}$ symbol.

Figure 11:
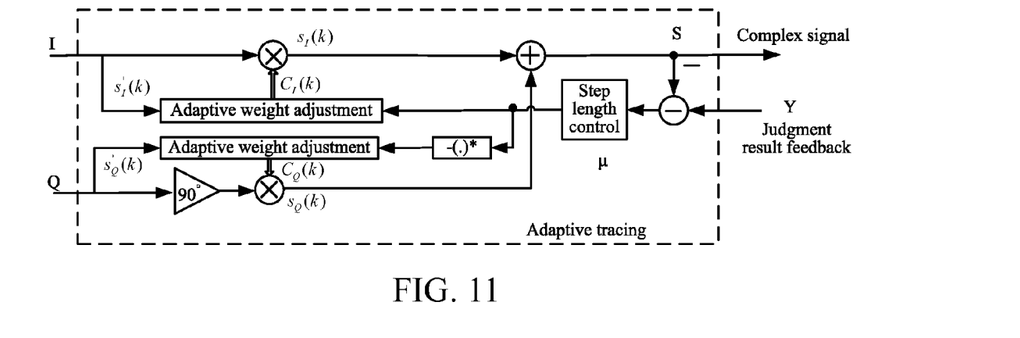
FIG. 11 is a schematic diagram of revising an I signal of a current frame after direct-current offset elimination and a Q signal of the current frame after direct-current offset elimination symbol by symbol by using a first-order adaptive filtering structure according to Embodiment 2 of the present invention.

In the method according to the embodiment of the present invention, a manner for revising the corrected I signal of the current frame and the corrected Q signal of the current frame symbol by symbol by using the first-order adaptive filtering structure is implemented by using a logic circuit, as specifically shown in FIG. 11.

At a receive end of an adaptive tracking circuit, the geometrically corrected I signal $s'_I(k)$ of the current frame and the geometrically corrected Q signal $s'_Q(k)$ of the current frame are separately received, and $s'_I(k)$ and $s'_Q(k)$ are transmitted on separate branch channels. A multiplier is arranged on a first branch channel of $s'_I(k)$ and $s'_Q(k)$. $s'_I(k)$ and $s'_Q(k)$ are multiplied by corresponding weight coefficients by using the multiplier to obtain a revised I signal $s_I(k)$ of the current frame and a revised Q signal $s_Q(k)$ of the current frame.

It should be noted that, after the corrected I signal of the current frame and the corrected Q signal of the current frame are revised symbol by symbol according to the first-order adaptive filtering structure, the revised I signal of the current frame and the revised Q signal of the current frame are synthesized into a complex signal; and after baseband processing is performed on the complex signal, a demodulator judges the complex signal. Then a judgment result Y is output and fed back.

Accordingly, as shown in FIG. 11, the method further includes revising two weight coefficients $C_I$ and $C_Q$ according to an error between the corrected complex signal and the judgment result Y fed back by the demodulator, so that the two coefficients change in a gradient direction of decreasing errors to keep approaching and compensate a distortion component in the IQ signals. The two weight coefficients $C_I$ and $C_Q$ are revised specifically by using a formula (4) as follows:

$$\begin{cases} C_I(k+1) = C_I(k) + \mu[Y(k) - S(k)]s'_I(k) \\ C_Q(k+1) = C_Q(k) - \mu[Y(k) - S(k)]^* s'_Q(k) \end{cases} \quad (4)$$

where, $C_I(k+1)$ is a weight coefficient used for revising an I signal of a $(k+1)^{th}$ symbol; $C_Q(k+1)$ is a weight coefficient used for revising a Q signal of the $(k+1)^{th}$ symbol; $C_I(k)$ is a weight coefficient used for revising an I signal of the $k^{th}$ symbol; $C_Q(k)$ is a weight coefficient used for revising a Q signal of the $k^{th}$ symbol; $Y(k)$ is a complex signal that includes the I signal and the Q signal of the $k^{th}$ symbol and output after the judgment; $S(k)$ is a complex signal that includes the I signal and the Q signal of the $k^{th}$ symbol and output before the judgment; $s'_I(k)$ is an I signal before the distortion compensation; $s'_Q(k)$ is a Q signal before the distortion compensation; $\mu$ indicates step length of coefficient updating; and * indicates an operation of getting a conjugate.

When the I signal and the Q signal are revised symbol by symbol according to the first-order adaptive filtering structure, an adaptive algorithm is capable of revising the I signal and the Q signal towards standard distortion-free constellation points with reference to the judgment result Y output and fed back by the demodulator, so as to implement precise compensation; and the symbol-by-symbol revision and update can quickly respond to a real-time change of distortion to better track the distortion.

Specifically, a logic circuit shown in FIG. 11 for adaptive tracking also provides a manner of adaptively adjusting weight.

After being operated by using an adder, the revised I signal $s_I(k)$ of the current frame and the revised Q signal $s_Q(k)$ of the current frame are synthesized into a complex signal S. The demodulator judges the complex signal S and then feeds back the judgment result Y. After being operated by a subtractor, the complex signal S and the judgment result Y are adjusted by step length control, respectively access a second branch channel of $s'_I(k)$ and $s'_Q(k)$, and are then operated according to the formula (4) to obtain revised weight coefficients.

206. Perform baseband processing on an I signal of the last frame after distortion compensation and a Q signal of the last frame after distortion compensation.

It should be noted that the content of this embodiment is applicable to a microwave communication backhaul system. As shown in FIG. 4, a signal form on an IQ signal input port is two channels of parallel signals, namely, an I signal and a Q signal; a signal form on a switch control input port is one channel of binary signals; a signal form on a judgment feedback input port is one channel of complex signals; a signal form on a bypass IQ signal output port is two channels of parallel signals, namely, an I signal and a Q signal; and a signal form on an adaptive correction output port is one channel of complex signals.

In low-order-modulation mode, signals of a bypass switch keep being on and only direct-current correction and geometric correction are performed. Corrected IQ signals are output from a bypass port to a subsequent processing module. There is no signal stream on the feedback input port and the adaptive tracking correction output port.

In high-order-modulation mode, signals of the bypass switch keep being off and adaptive tracking correction is activated. Corrected complex signals are output from an adaptive tracking correction output port. The complex signals are input to the feedback input port after being judged. There is no signal stream on the bypass output port.

In adaptive modulation mode, the number of modulation orders changes adaptively according to a received signal-to-noise ratio of a system. In this case, IQ correction can switch signals of the bypass switch to activate or bypass an adaptive tracking module, depending on whether the modulation mode is high-order or low-order; or keep closing the bypass switch to activate the adaptive tracking module in a long term and reduce switching.

Figure 12:
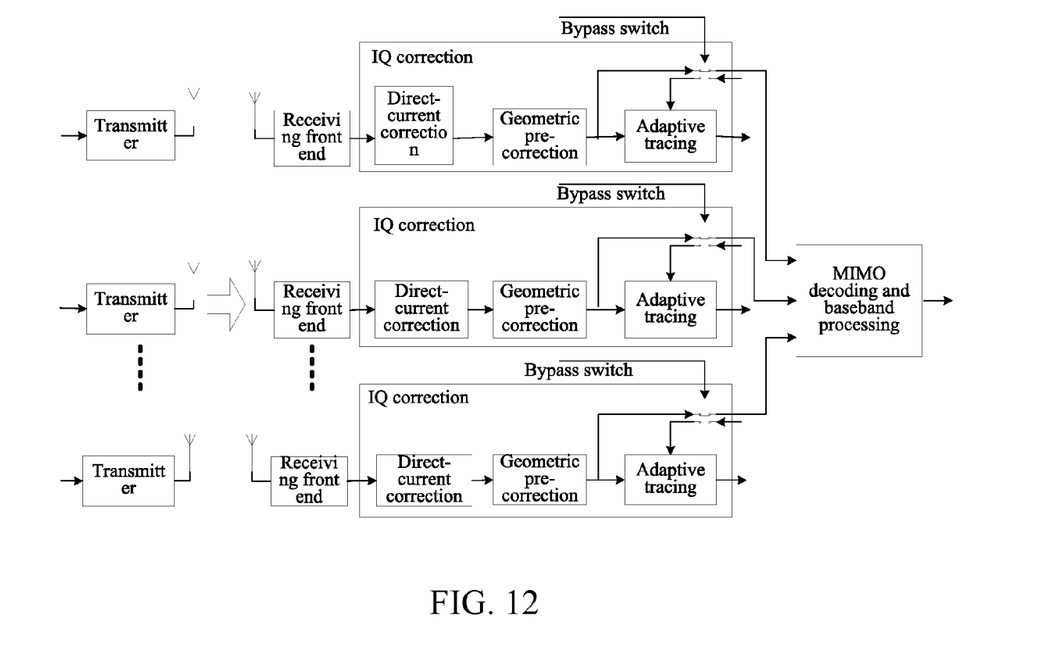
FIG. 12 is a schematic diagram of a first manner for correcting IQ signals in a MIMO system according to Embodiment 2 of the present invention.

Further, the method may also be applied in a multiple-input multiple-output (MIMO) microwave communication system. In a method according to the present invention, the following two manners may be provided for correcting IQ signals in a MIMO system:

Manner 1 is specifically shown in FIG. 12.

Multiple antenna arrays are used at both a transmit end and a receive end to implement point-to-point backhaul communications. Multiple channels of signal streams are simultaneously transmitted between transmit and receive antenna arrays in the MIMO system. Receiving front ends rely on back-end MIMO decoding to restore data from the multiple channels of signal streams. Specifically, corresponding IQ correcting modules are connected to multiple receiving front ends. The number of modulation orders in the system is not very high out of complexity consideration. Therefore, during IQ correction, adaptive tracking correction is bypassed and IQ correction operates in a state without judgment feedback. After signals received by the receiving front ends experience the IQ correction, the MIMO system performs decoding and baseband processing. In this manner, an IQ correction method is same as the foregoing embodiment and no further details are provided herein.

In the first manner, feedback-free states of IQ correcting modules greatly simplify a structure of the MIMO system with IQ correction. This manner enables subsequent baseband processing structures of various channels of IQ signals to be integrated.

Figure 13:
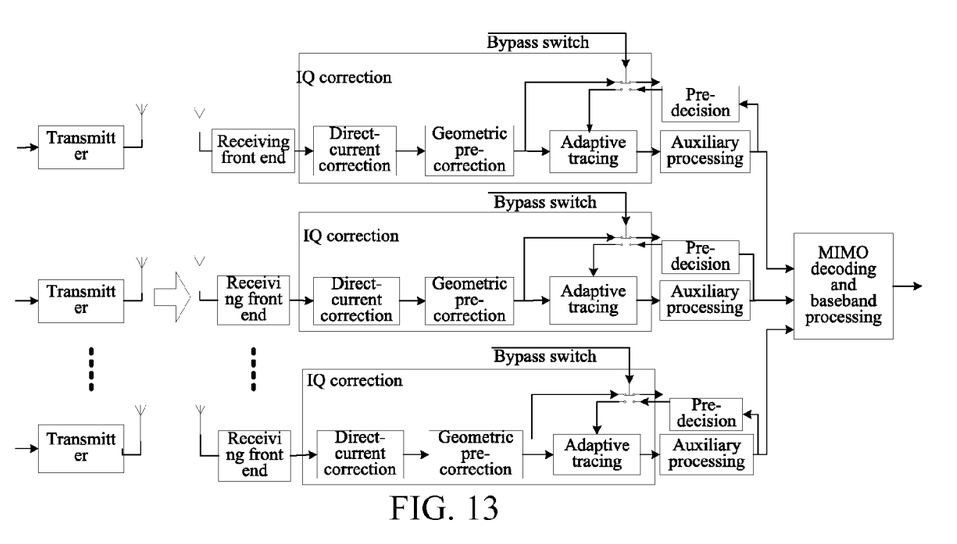
FIG. 13 is a schematic diagram of a second manner for correcting IQ signals in a MIMO system according to Embodiment 2 of the present invention.

Manner 2 is specifically shown in FIG. 13.

In a manner of correcting IQ signals shown in FIG. 13, an auxiliary processing module that helps to generate a feedback signal and a pre-judgment module are added on each branch channel based on FIG. 12. Pre-judgment and auxiliary processing are digital processing for a single channel of signals. A judgment result provides a reference for correcting IQ signals on a current branch channel. It should be noted that a judgment result of each branch channel provides a reference for correcting IQ signals only on the current branch channel but does not constitute an ultimate decoding result. Ultimate decoding and judgment outputs are generated by a decoding and baseband processing module of the MIMO system.

It should be noted that, in the manner of correcting IQ signals shown in FIG. 13, each branch channel needs to contain an independent feedback loop; therefore, an auxiliary functional module for generating a feedback signal during baseband processing must be modified, extracted, and separately placed on multiple signal processing branch channels. Feedback not only complicates a system structure but also causes great difficulties in decoding and functional module separation.

In the method for correcting IQ signals according to the embodiment of the present invention, an I signal of a last frame and a Q signal of the last frame are buffered, and direct-current offset elimination and geometric correction are performed on an I signal of a current frame and a Q signal of the current frame according to the I signal of the last frame and the Q signal of the last frame. In this way, distortion of IQ signals and distortion of an IQ signal constellation diagram can be eliminated to facilitate subsequent signal processing and demodulation without using hardware, thereby greatly lowering a hardware cost.

Figure 14:
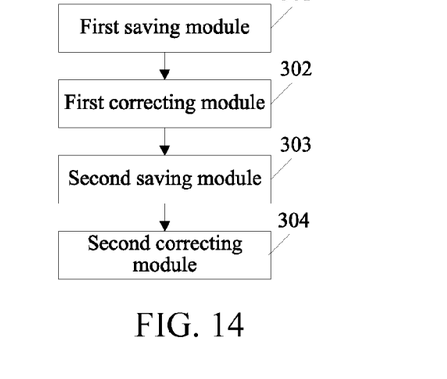
FIG. 14 is a schematic structural diagram of an apparatus for correcting IQ signals according to Embodiment 3 of the present invention.

As shown in FIG. 14, another embodiment (Embodiment 3) provides an apparatus for correcting IQ signals. The apparatus includes a number of modules. A first saving module 301 is configured to save an I signal of a last frame and a Q signal of the last frame. A first correcting module 302 is configured to receive an I signal of a current frame and a Q signal of the current frame, to eliminate a direct-current offset of the I signal of the current frame according to the I signal of the last frame saved by the first saving module 301, and to eliminate a direct-current offset of the Q signal of the current frame according to the Q signal of the last frame saved by the first saving module.

A second saving module 303 is configured to save an I signal of the last frame after direct-current offset elimination and a Q signal of the last frame after direct-current offset elimination that are obtained by the first correcting module 302. A second correcting module 304 is configured to geometrically correct an I signal of the current frame after direct-current offset elimination and a Q signal of the current frame after direct-current offset elimination according to the I signal of the last frame after direct-current offset elimination and the Q signal of the last frame after direct-current offset elimination that are saved by the second saving module 303 to obtain a corrected I signal of the current frame and a corrected Q signal of the current frame.

Figure 15:
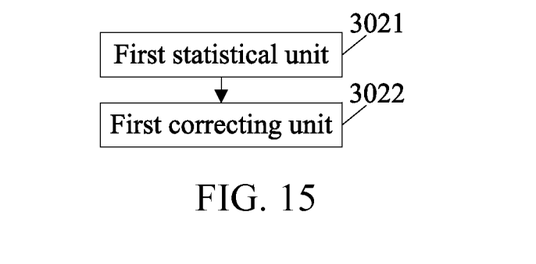
FIG. 15 is a schematic structural diagram of a first correcting module of an apparatus for correcting IQ signals according to Embodiment 3 of the present invention.

Further, as shown in FIG. 15, the first correcting module 302 specifically includes a first statistical unit 3021, which is configured to statistically measure an average level value of the I signal of the last frame to obtain a direct-current offset of the I signal of the last frame, and to eliminate a direct-current offset of the I signal of the current frame according to the direct-current offset of the I signal of the last frame. The first correcting module 302 also includes a first correcting unit 3022, which is configured to statistically measure an average level value of the Q signal of the last frame to obtain a direct-current offset of the Q signal of the last frame, and eliminate a direct-current offset of the Q signal of the current frame according to the direct-current offset of the Q signal of the last frame.

Figure 16:
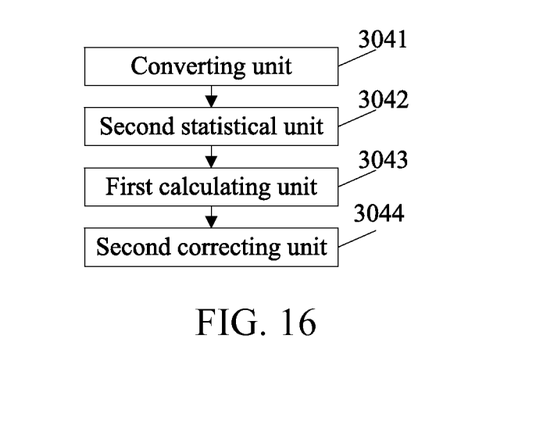
FIG. 16 is a schematic diagram of a first structure of a second correcting module of an apparatus for correcting IQ signals according to Embodiment 3 of the present invention.

Further, as shown in FIG. 16, the second correcting module 304 specifically includes a number of units. A converting unit 3041 is configured to express, by using a constellation diagram, the I signal of the last frame after direct-current offset elimination and the Q signal of the last frame after direct-current offset elimination. A second statistical unit 3042 is configured to statistically measure mean vectors in a first quadrant and a second quadrant of the constellation diagram of the I signal of the last frame after direct-current offset elimination and the Q signal of the last frame after direct-current offset elimination to obtain a first vector and a second vector. A first calculating unit 3043 is configured to calculate a third vector and a fourth vector according to the first vector and the second vector, and calculate an included angle α between the fourth vector and an X axis. The third vector is a mean vector of the first vector and the second vector, and the fourth vector is a difference between the first vector and the second vector. A second correcting unit 3044, is configured to geometrically correct the I signal of the current frame after direct-current offset elimination and the Q signal of the current frame after direct-current offset elimination according to the third vector, the fourth vector, and the included angle α to obtain the corrected I signal of the current frame and the corrected Q signal of the current frame.

Figure 17:
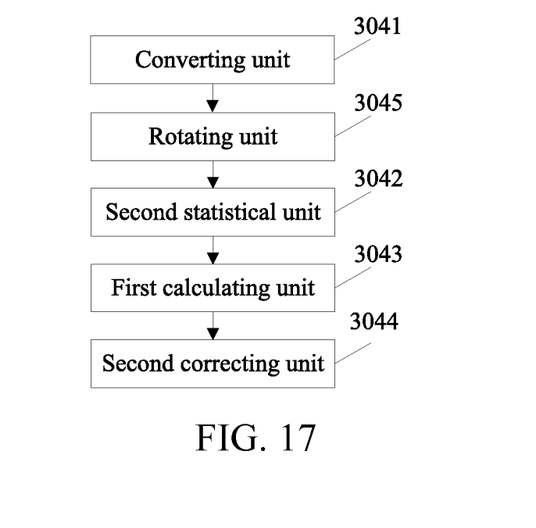
FIG. 17 is a schematic diagram of a second structure of a second correcting module of an apparatus for correcting IQ signals according to Embodiment 3 of the present invention.

Further, as shown in FIG. 17, the second correcting module 304 further includes a rotating unit 3045, which is configured to rotate a third quadrant and a fourth quadrant of the constellation diagram of the I signal of the last frame after direct-current offset elimination and the Q signal of the last frame after direct-current offset elimination around a base point by 180 degrees before the second statistical unit 3042 statistically measures the mean vectors in the first quadrant and the second quadrant of the constellation diagram of the I signal of the last frame after direct-current offset elimination and the Q signal of the last frame after direct-current offset elimination to obtain the first vector and the second vector.

Further, the second correcting unit 3044 specifically includes first and second subunits. A first correcting subunit 30441 is configured to multiply the I signal of the current frame after direct-current offset elimination by the fourth vector to obtain the corrected I signal of the current frame. A second correcting subunit 30442 is configured to multiply the Q signal of the current frame after direct-current offset elimination by the included angle α and then by the third vector to obtain the corrected Q signal of the current frame.

Figure 18:
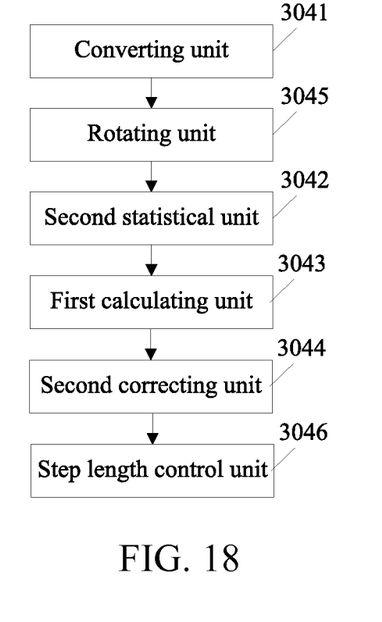
FIG. 18 is a schematic diagram of a third structure of a second correcting module of an apparatus for correcting IQ signals according to Embodiment 3 of the present invention.

Further, as shown in FIG. 18, the second correcting module 304 further includes a step length control unit 3046, which is configured to control step length of the third vector and the fourth vector before the second correcting unit 3044 geometrically corrects the I signal of the current frame after direct-current offset elimination and the Q signal of the current frame after direct-current offset elimination according to the third vector, the fourth vector, and the included angle α to obtain the corrected I signal of the current frame and the corrected Q signal of the current frame.

Figure 19:
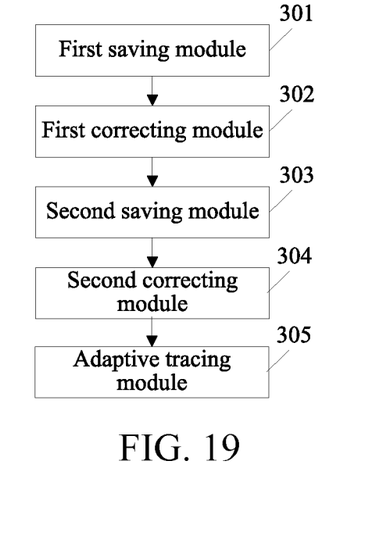
FIG. 19 is a schematic diagram of a second structure of an apparatus for correcting IQ signals according to Embodiment 3 of the present invention.

Further, as shown in FIG. 19, the apparatus further includes an adaptive tracking module 305, which is configured to revise, after the second correcting module 304 obtains the corrected I signal of the current frame and the corrected Q signal of the current frame, the corrected I signal of the current frame and the corrected Q signal of the current frame symbol by symbol according to a first-order adaptive filtering structure to obtain a revised I signal of the current frame and a revised Q signal of the current frame, and to synthesize the revised I signal of the current frame and the revised Q signal of the current frame into a complex signal.

Further, the adaptive tracking module 305 specifically includes a third correcting unit 3051, which is configured to perform symbol-by-symbol distortion compensation of the corrected I signal of the current frame and the corrected Q signal of the current frame by using weight coefficients $C_I(k)$ and $C_Q(k)$ according to a first formula which is specifically as follows:

$$\begin{cases} s_I(k) = C_I(k) \cdot s'_I(k) \\ s_Q(k) = C_Q(k) \cdot s'_Q(k) \end{cases}$$

In this equation, $s'_I(k)$ is an I signal before the distortion compensation; $s'_Q(k)$ is a Q signal before the distortion compensation; $s'_I(k)$ is an I signal after the distortion compensation; $s_Q(k)$ is a Q signal after the distortion compensation; and k indicates a $k^{th}$ symbol. A synthesizing unit 3052 is configured to synthesize the revised IQ signals into a complex signal.

Further, the apparatus further includes a judgment result receiving module 306, which configured to receive, after the complex signal is judged, a judgment result output after the judgment.

Accordingly, the apparatus further includes a weight coefficient revising module 307, which is configured to revise, after the judgment result receiving module 305 receives the judgment result output after the judgment, the weight coefficients according to the complex signal and the result output after the judgment and by using a second formula as follows.

$$\begin{cases} C_I(k+1) = C_I(k) + \mu[Y(k) - S(k)]s'_I(k) \\ C_Q(k+1) = C_Q(k) - \mu[Y(k) - S(k)]^* s'_Q(k) \end{cases}$$

In this equation, $C_I(k+1)$ is a weight coefficient used for revising an I signal of a $(k+1)^{th}$ symbol; $C_Q(k+1)$ is a weight coefficient used for revising a Q signal of the $(k+1)^{th}$ symbol; $C_I(k)$ is a weight coefficient used for revising an I signal of the $k^{th}$ symbol; $C_Q(k)$ is a weight coefficient used for revising a Q signal of the $k^{th}$ symbol; $Y(k)$ is a complex signal that includes the I signal and the Q signal of the $k^{th}$ symbol and output after the judgment; $s'_Q(k)$ is a complex signal that includes the I signal and the Q signal of the $k^{th}$ symbol and output before the judgment; $s'_I(k)$ is an I signal before the distortion compensation; $s'_Q(k)$ is a Q signal before the distortion compensation; μ indicates step length of coefficient updating; and * indicates an operation of getting a conjugate.

In the apparatus for correcting IQ signals according to the embodiment of the present invention, an I signal of a last frame and a Q signal of the last frame are buffered, and direct-current offset elimination and geometric correction are performed on an I signal of a current frame and a Q signal of the current frame according to the I signal of the last frame and the Q signal of the last frame. In this way, distortion of IQ signals and distortion of an IQ signal constellation diagram can be eliminated to facilitate subsequent signal processing and demodulation without using hardware, thereby greatly lowering a hardware cost.

Persons of ordinary skill in the art may understand that all or a part of the steps in the embodiments may be implemented by hardware or by a program instructing relevant hardware. The program may be stored in a computer readable storage medium. The storage medium may be a read-only memory, a magnetic disk, an optical disk, or the like.

The foregoing descriptions are merely exemplary embodiments of the present invention, but are not intended to limit the present invention. All modifications, equivalent replacements, improvements and the like made within the spirit and principle of the present invention shall fall within the protection scope of the present invention.

What is claimed is:

1. A method for correcting in-phase and quadrature-phase IQ signals, the method comprising:
   saving an I signal of a last frame and a Q signal of the last frame;
   receiving an I signal of a current frame and a Q signal of the current frame;
   eliminating a direct-current offset of the I signal of the current frame according to a statistically measured average level value of the I signal of the last frame;
   eliminating a direct-current offset of the Q signal of the current frame according to a statistically measured average level value of the Q signal of the last frame;
   saving an I signal of the last frame after direct-current offset elimination and a Q signal of the last frame after direct-current offset elimination; and
   geometrically correcting an I signal of the current frame after direct-current offset elimination and a Q signal of the current frame after direct-current offset elimination according to the I signal of the last frame after direct-current offset elimination and the Q signal of the last frame after direct-current offset elimination to obtain a corrected I signal of the current frame and a corrected Q signal of the current frame, the geometrically correcting the I signal and the Q signal comprising:
   expressing, by using a constellation diagram, the I signal of the last frame after direct-current offset elimination and the Q signal of the last frame after direct-current offset elimination;
   rotating a third quadrant and a fourth quadrant of the constellation diagram of the I signal of the last frame after direct-current offset elimination and the Q signal of the last frame after direct-current offset elimination around a base point by 180 degrees,
   statistically measuring, after the rotating the third quadrant and the fourth quadrant of the I signal, mean vectors in a first quadrant and a second quadrant of the constellation diagram of the I signal of the last frame after direct-current offset elimination and the Q signal of the last frame after direct-current offset elimination to obtain a first vector and a second vector;

calculating a third vector and a fourth vector according to the first vector and the second vector, and calculating an included angle α between the fourth vector and an X axis, wherein the third vector is a mean vector of the first vector and the second vector, and the fourth vector is a difference between the first vector and the second vector; and geometrically correcting the I signal of the current frame after direct-current offset elimination and the Q signal of the current frame after direct-current offset elimination according to the third vector, the fourth vector, and the included angle α to obtain the corrected I signal of the current frame and the corrected Q signal of the current frame.

2. The method according to claim 1, wherein eliminating the direct-current offset of the I signal of the current frame and the a direct-current offset of the Q signal of the current frame comprises:

statistically measuring an average level value of the I signal of the last frame to obtain a direct-current offset of the I signal of the last frame;

eliminating a direct-current offset of the I signal of the current frame according to the direct-current offset of the I signal of the last frame;

statistically measuring an average level value of the Q signal of the last frame to obtain a direct-current offset of the Q signal of the last frame; and eliminating a direct-current offset of the Q signal of the current frame according to the direct-current offset of the Q signal of the last frame.

3. The method according to claim 1, wherein geometrically correcting the I signal of the current frame after direct-current offset elimination and the Q signal of the current frame after direct-current offset elimination according to the third vector, the fourth vector, and the included angle α to obtain the corrected I signal of the current frame and the corrected Q signal of the current frame specifically comprises:

multiplying the I signal of the current frame after direct-current offset elimination by the fourth vector to obtain the corrected I signal of the current frame; and multiplying the Q signal of the current frame after direct-current offset elimination by the included angle α and then by the third vector to obtain the corrected Q signal of the current frame.

4. The method according to claim 1, wherein, before geometrically correcting the I signal of the current frame after direct-current offset elimination and the Q signal of the current frame after direct-current offset elimination according to the third vector, the fourth vector, and the included angle α to obtain the corrected I signal of the current frame and the corrected Q signal of the current frame, the method further comprises controlling step length of the third vector and the fourth vector.

5. The method according to claim 4, wherein, after obtaining the corrected I signal of the current frame and the corrected Q signal of the current frame, the method further comprises:

revising the corrected I signal of the current frame and the corrected Q signal of the current frame symbol by symbol according to a first-order adaptive filtering structure to obtain a revised I signal of the current frame and a revised Q signal of the current frame, and synthesizing the revised I signal of the current frame and the revised Q signal of the current frame into a complex signal.

6. The method according to claim 5, wherein revising the corrected I signal of the current frame and the corrected Q signal of the current frame symbol by symbol according to a first-order adaptive filtering structure comprises:

performing symbol-by-symbol distortion compensation on the corrected I signal of the current frame and the corrected Q signal of the current frame by using weight coefficients $C_I(k)$ and $C_Q(k)$ according to a first formula which is specifically:

$$\begin{cases} s_I(k) = C_I(k) \cdot s'_I(k) \\ s_Q(k) = C_Q(k) \cdot s'_Q(k) \end{cases}$$

wherein, $s'_I(k)$ is an I signal before the distortion compensation; $s'_Q(k)$ is a Q signal before the distortion compensation; $s'_I(k)$ is an I signal after the distortion compensation; $s_Q(k)$ is a Q signal after the distortion compensation; and k indicates a $k^{th}$ symbol.

7. The method according to claim 6, further comprising: receiving, after the complex signal is judged, a judgment result output after the judgment.

8. The method according to claim 7, wherein, after receiving a judgment result output after the judgment, the method further comprises:

revising the weight coefficients according to the complex signal and the judgment result by using a second formula which is specifically as follows:

$$\begin{cases} C_I(k+1) = C_I(k) + \mu[Y(k) - S(k)]s'_I(k) \\ C_Q(k+1) = C_Q(k) - \mu[Y(k) - S(k)]^*s'_Q(k) \end{cases}$$

wherein, $C_I(k+1)$ is a weight coefficient used for revising an I signal of a $(k+1)^{th}$ symbol; $C_Q(k+1)$ is a weight coefficient used for revising a Q signal of the $(k+1)^{th}$ symbol; $C_I(k)$ is a weight coefficient used for revising an I signal of the $k^{th}$ symbol; $C_Q(k)$ is a weight coefficient used for revising a Q signal of the $k^{th}$ symbol; $Y(k)$ is a complex signal that comprises the I signal and the Q signal of the $k^{th}$ symbol and output after the judgment; $S(k)$ is a complex signal that comprises the I signal and the Q signal of the $k^{th}$ symbol and output before the judgment; $s'_I(k)$ is an I signal before the distortion compensation; $s'_Q(k)$ is a Q signal before the distortion compensation; $\mu$ indicates step length of coefficient updating; and * indicates an operation of getting a conjugate.

9. An apparatus for correcting in-phase and quadrature-phase IQ signals, the apparatus comprising:

a first saving module, configured to save an I signal of a last frame and a Q signal of the last frame;

a first correcting module, configured to receive an I signal of a current frame and a Q signal of the current frame, eliminate a direct-current offset of the I signal of the current frame according to a statistically measured average level value of the I signal of the last frame saved by the first saving module, and to eliminate a direct-current offset of the Q signal of the current frame according to a statistically measured average level value of the Q signal of the last frame saved by the first saving module;

a second saving module, configured to save an I signal of the last frame after direct-current offset elimination and a Q signal of the last frame after direct-current offset elimination that are obtained by the first correcting module;

a second correcting module, configured to geometrically correct an I signal of the current frame after direct-current offset elimination and a Q signal of the current frame after direct-current offset elimination according to the I signal of the last frame after direct-current offset elimination and the Q signal of the last frame after direct-current offset elimination that are saved by the second saving module to obtain a corrected I signal of the current frame and a corrected Q signal of the current frame; and an adaptive tracking module, configured to revise, after the second correcting module obtains the corrected I signal of the current frame and the corrected Q signal of the current frame, the corrected I signal of the current frame and the corrected Q signal of the current frame symbol by symbol according to a first-order adaptive filtering structure to obtain a revised I signal of the current frame and a revised Q signal of the current frame, and synthesize the revised I signal of the current frame and the revised Q signal of the current frame into a complex signal.

10. The apparatus according to claim 9, wherein the first correcting module comprises:

a first statistical unit, configured to statistically measure an average level value of the I signal of the last frame to obtain a direct-current offset of the I signal of the last frame, and eliminate a direct-current offset of the I signal of the current frame and the Q signal of the current frame according to the direct-current offset of the I signal of the last frame; and a first correcting unit, configured to statistically measure an average level value of the Q signal of the last frame to obtain a direct-current offset of the Q signal of the last frame, and eliminate a direct-current offset of the Q signal of the current frame according to the direct-current offset of the Q signal of the last frame.

11. The apparatus according to claim 9, wherein the second correcting module comprises:

a converting unit, configured to express, by using a constellation diagram, the I signal of the last frame after direct-current offset elimination and the Q signal of the last frame after direct-current offset elimination;

a second statistical unit, configured to statistically measure mean vectors in a first quadrant and a second quadrant of the constellation diagram of the I signal of the last frame after direct-current offset elimination and the Q signal of the last frame after direct-current offset elimination to obtain a first vector and a second vector;

a first calculating unit, configured to calculate a third vector and a fourth vector according to the first vector and the second vector, and calculate an included angle α between the fourth vector and an X axis, wherein the third vector is a mean vector of the first vector and the second vector, and the fourth vector is a difference between the first vector and the second vector; and a second correcting unit, configured to geometrically correct the I signal of the current frame after direct-current offset elimination and the Q signal of the current frame after direct-current offset elimination according to the third vector, the fourth vector, and the included angle α to obtain the corrected I signal of the current frame and the corrected Q signal of the current frame.

12. The apparatus according to claim 11, wherein the second correcting module further comprises:

a rotating unit, configured to rotate a third quadrant and a fourth quadrant of the constellation diagram of the I signal of the last frame after direct-current offset elimination and the Q signal of the last frame after direct-current offset elimination around a base point by 180 degrees before the second statistical unit statistically measures the mean vectors in the first quadrant and the second quadrant of the constellation diagram of the I signal of the last frame after direct-current offset elimination and the Q signal of the last frame after direct-current offset elimination to obtain the first vector and the second vector.

13. The apparatus according to claim 11, wherein the second correcting unit comprises:

a first correcting subunit, configured to multiply the I signal of the current frame after direct-current offset elimination by the fourth vector to obtain the corrected I signal of the current frame; and a second correcting subunit, configured to multiply the Q signal of the current frame after direct-current offset elimination by the included angle α and then by the third vector to obtain the corrected Q signal of the current frame.

14. The apparatus according to claim 11, wherein the second correcting module further comprises:

a step length control unit, configured to control step length of the third vector and the fourth vector before the second correcting unit geometrically corrects the I signal of the current frame after direct-current offset elimination and the Q signal of the current frame after direct-current offset elimination according to the third vector, the fourth vector, and the included angle α to obtain the corrected I signal of the current frame and the corrected Q signal of the current frame.

15. The apparatus according to claim 9, wherein the adaptive tracking module comprises:

a third correcting unit, configured to perform symbol-by-symbol distortion compensation on the corrected I signal of the current frame and the corrected Q signal of the current frame by using weight coefficients $C_I(k)$ and $C_Q(k)$ according to a first formula which is specifically as follows:

$$\begin{cases} s_I(k) = C_I(k) \cdot s'_I(k) \\ s_Q(k) = C_Q(k) \cdot s'_Q(k) \end{cases}$$

wherein, $s'_I(k)$ is an I signal before the distortion compensation; $s'_Q(k)$ is a Q signal before the distortion compensation; $s_I(k)$ is an I signal after the distortion compensation; $s_Q(k)$ is a Q signal after the distortion compensation; and k indicates a $k^{th}$ symbol; and a synthesizing unit, configured to synthesize the revised IQ signals into the complex signal.

16. The apparatus according to claim 15, further comprising:

a judgment result receiving module, configured to receive, after the complex signal is judged, a judgment result output after the judgment.

17. The apparatus according to claim 16, further comprising:

a weight coefficient revising module, configured to revise, after the judgment result receiving module receives the judgment result output after the judgment, the weight coefficients according to the complex signal and the judgment result by using a second formula which is specifically as follows:

$$\begin{cases} C_I(k+1) = C_I(k) + \mu[Y(k) - S(k)]s'_I(k) \\ C_Q(k+1) = C_Q(k) - \mu[Y(k) - S(k)]^* s'_Q(k) \end{cases}$$

wherein, $C_I(k+1)$ is a weight coefficient used for revising an I signal of a $(k+1)^{th}$ symbol; $C_Q(k+1)$ is a weight coefficient used for revising a Q signal of the $(k+1)^{th}$ symbol; $C_I(k)$ is a weight coefficient used for revising an I signal of the $k^{th}$ symbol; $C_Q(k)$ is a weight coefficient used for revising a Q signal of the $k^{th}$ symbol; $Y(k)$ is a complex signal that comprises the I signal and the Q signal of the $k^{th}$ symbol and output after the judgment; $S(k)$ is a complex signal that comprises the I signal and the Q signal of the $k^{th}$ symbol and output before the judgment; $s'_I(k)$ is an I signal before the distortion compensation; $s'_Q(k)$ is a Q signal before the distortion compensation; $\mu$ indicates step length of coefficient updating; and * indicates an operation of getting a conjugate.

* * * * *